(12) United States Patent
Saldanha et al.

(10) Patent No.: US 12,153,675 B2
(45) Date of Patent: *Nov. 26, 2024

(54) MEMORY TRACKING FOR MALWARE DETECTION

(71) Applicant: Juniper Networks, Inc., Sunnyvale, CA (US)

(72) Inventors: Anoop Wilbur Saldanha, Bangalore (IN); Abhijit Mohanta, Bangalore (IN); Sudhir R. Dhankhar, Dublin, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,667

(22) Filed: Dec. 14, 2022

(65) Prior Publication Data

US 2023/0127205 A1 Apr. 27, 2023

Related U.S. Application Data

(63) Continuation of application No. 16/948,684, filed on Sep. 29, 2020, now Pat. No. 11,562,066, which is a
(Continued)

(30) Foreign Application Priority Data

Jul. 16, 2018 (IN) .............................. 201841026426

(51) Int. Cl.
*G06F 12/14* (2006.01)
*G06F 21/53* (2013.01)
(Continued)

(52) U.S. Cl.
CPC .......... *G06F 21/56* (2013.01); *G06F 12/1416* (2013.01); *G06F 2212/1052* (2013.01); *G06F 2221/033* (2013.01)

(58) Field of Classification Search
CPC ................. G06F 21/56; G06F 12/1416; G06F 2212/1052; G06F 2221/033
(Continued)

(56) References Cited

U.S. PATENT DOCUMENTS

| | | | | |
|---|---|---|---|---|
| 7,836,504 | B2 * | 11/2010 | Ray .................. | G06F 12/145 713/168 |
| 8,104,089 | B1 * | 1/2012 | Guo .................. | G06F 12/145 713/193 |

(Continued)

OTHER PUBLICATIONS

Junghwan Rhee; Kernel Malware Analysis with Un-tampered and Temporal Views of Dynamic Kernel Memory: Springer:2010; pp. 178-197.*

(Continued)

*Primary Examiner* — Monjur Rahim
(74) *Attorney, Agent, or Firm* — Harrity & Harrity, LLP

(57) ABSTRACT

A device may load a process under test into virtual memory associated with the device. The virtual memory may include a plurality of memory pages. The device may insert a malware inspection element and a memory tracking element into the process under test and may provide a notification of an event associated with the process under test to a memory tracking element. The device may identify, using the memory tracking element, one or more memory pages of the plurality of memory pages. The one or more memory pages may be assigned to, and used by, the process under test. The device may generate, based on identifying the one or more memory pages, a memory map, associated with the process under test, that may include information identifying the one or more memory pages as being assigned to, and used by, the process under test.

20 Claims, 10 Drawing Sheets

Related U.S. Application Data continuation of application No. 16/119,686, filed on Aug. 31, 2018, now Pat. No. 10,795,993.

(51) Int. Cl.
*G06F 21/55* (2013.01)
*G06F 21/56* (2013.01)
*H04L 9/40* (2022.01)

(58) Field of Classification Search
USPC .......................................................... 726/23
See application file for complete search history.

(56) References Cited

U.S. PATENT DOCUMENTS

| | | | |
|---|---|---|---|
| 8,397,242 B1 | 3/2013 | Conover | |
| 8,738,708 B2 | 5/2014 | Chasin | |
| 8,832,835 B1 | 9/2014 | Chen et al. | |
| 9,262,246 B2* | 2/2016 | Sallam | G06F 21/554 |
| 9,275,223 B2* | 3/2016 | Kapoor | H04L 63/10 |
| 9,626,509 B1 | 4/2017 | Khalid et al. | |
| 10,552,308 B1* | 2/2020 | Rohlf | G06F 12/08 |
| 10,565,376 B1* | 2/2020 | Jung | G06F 11/302 |
| 10,628,586 B1* | 4/2020 | Jung | G06F 11/3037 |
| 10,795,993 B2 | 10/2020 | Saldanha et al. | |
| 10,944,764 B2* | 3/2021 | Mixer | H04L 63/1416 |
| 2011/0219447 A1 | 9/2011 | Horovitz et al. | |
| 2012/0005755 A1 | 1/2012 | Kitazawa et al. | |
| 2012/0054829 A1 | 3/2012 | Holostov et al. | |
| 2012/0254982 A1 | 10/2012 | Sallam | |
| 2012/0254995 A1* | 10/2012 | Sallam | G06F 21/52 726/22 |
| 2012/0255018 A1 | 10/2012 | Sallam | |
| 2013/0132690 A1* | 5/2013 | Epstein | G06F 12/145 711/159 |
| 2013/0239215 A1 | 9/2013 | Kaufman | |
| 2013/0246685 A1* | 9/2013 | Bhargava | G06F 21/00 711/6 |
| 2013/0312099 A1* | 11/2013 | Edwards | G06F 21/554 726/24 |
| 2014/0068761 A1 | 3/2014 | Ragavan et al. | |
| 2014/0115652 A1* | 4/2014 | Kapoor | H04L 63/10 726/1 |
| 2015/0095590 A1* | 4/2015 | Lu | G06F 9/4552 711/146 |
| 2015/0215335 A1 | 7/2015 | Giuliani et al. | |
| 2015/0261955 A1 | 9/2015 | Huang et al. | |
| 2016/0021142 A1 | 1/2016 | Gafni et al. | |
| 2017/0116417 A1 | 4/2017 | Jhi et al. | |
| 2018/0060579 A1* | 3/2018 | Stepan | G06F 21/54 |
| 2018/0074976 A1 | 3/2018 | Norris et al. | |
| 2018/0219896 A1 | 8/2018 | Kokko et al. | |
| 2019/0124030 A1 | 4/2019 | Pierce et al. | |
| 2020/0320196 A1* | 10/2020 | Bi | G06F 12/1009 |
| 2021/0012004 A1 | 1/2021 | Dhankhar et al. | |

OTHER PUBLICATIONS

Aghaeikheirabady et al., "A New Approach to Malware Detection by Comparative Analysis of Data Structures in a Memory Image," IEEE, International Congress on Technology Communication and Knowledge (ICTCK), Nov. 26-27, 2014, pp. 1-4.

Extended European Search Report for Application No. EP19165953.1, mailed on Oct. 11, 2019.

Extended European Search Report for Application No. EP23207939.2, mailed on Feb. 13, 2024, 10 pages.

* cited by examiner

MEMORY TRACKING FOR MALWARE DETECTION

RELATED APPLICATION

This application is a continuation of U.S. patent application Ser. No. 16/948,684, filed Sep. 29, 2020, which is a continuation of U.S. patent application Ser. No. 16/119,686, filed Aug. 31, 2018 (now U.S. Pat. No. 10,795,993), which claims priority under 35 U.S.C. § 119 to India Patent Application No. 201841026426, filed on Jul. 16, 2018, the contents of which are incorporated herein by reference in their entireties.

BACKGROUND

Malware, or malicious software, may include software that is intended to act maliciously to a computer system, a user of the computer system, and/or a computer network. In some cases, malware may include a virus, a worm, a Trojan horse, ransomware, spyware, adware, and/or the like.

SUMMARY

According to some implementations, a device may include one or more memories, and one or more processors to load a process under test into virtual memory associated with the device, wherein the virtual memory includes a plurality of memory pages. The one or more processors may insert a malware inspection element and a memory tracking element into the process under test. The one or more processors may provide, using the malware inspection element, a notification of an event associated with the process under test to the memory tracking element. The one or more processors may identify, using the memory tracking element and based on information included in the notification, one or more memory pages of the plurality of memory pages, wherein the one or more memory pages are assigned to, and used by, the process under test. The one or more processors may generate, using the memory tracking element and based on identifying the one or more memory pages, a memory map associated with the process under test, wherein the memory map includes information identifying the one or more memory pages as being assigned to, and used by, the process under test, and wherein the memory map is to be used to determine whether the process under test includes malware.

According to some implementations, a non-transitory computer-readable medium may store instructions that include one or more instructions that, when executed by one or more processors of a device, cause the one or more processors to load a process under test into virtual memory associated with the device, wherein the virtual memory includes a plurality of memory pages. The one or more instructions may cause the one or more processors to insert a malware inspection element and a memory tracking element into the process under test. The one or more instructions may cause the one or more processors to provide, using the malware inspection element, a notification of an event associated with the process under test to the memory tracking element. The one or more instructions may cause the one or more processors to identify, using the memory tracking element and based on information included in the notification, one or more memory pages of the plurality of memory pages, wherein the one or more memory pages are assigned to, and used by, the process under test. The one or more instructions may cause the one or more processors to generate, using the memory tracking element and based on identifying the one or more memory pages, a memory map associated with the process under test, wherein the memory map includes information identifying the one or more memory pages as being assigned to, and used by, the process under test. The one or more instructions may cause the one or more processors to track, using the memory tracking element and using the memory map, the one or more memory pages to determine whether the process under test includes malware.

According to some implementations, a method may include loading, by a device, a process under test into virtual memory associated with the device, wherein the virtual memory includes a plurality of memory pages. The method may include inserting, by the device, a malware inspection element and a memory tracking element into the process under test. The method may include providing, by the device and using the malware inspection element, a notification of an event associated with the process under test to the memory tracking element. The method may include identifying, by the device and using the memory tracking element and based on information included in the notification, one or more memory pages of the plurality of memory pages, wherein the one or more memory pages are assigned to, and used by, the process under test. The method may include generating, by the device and using the memory tracking element and based on identifying the one or more memory pages, a memory map associated with the process under test, wherein the memory map includes information identifying a memory page range assigned to the process under test, and wherein the memory map includes information identifying the one or more memory pages as being assigned to, and used by, the process under test. The method may include determining, by the device and based on the memory map, whether the process under test includes malware.

DETAILED DESCRIPTION

The following detailed description of example implementations refers to the accompanying drawings. The same reference numbers in different drawings may identify the same or similar elements.

Memory pages may identify portions of virtual memory that have been assigned to and/or used by a process. The memory pages assigned to a process may be divided such that the memory pages may be used by different elements of the process. In some cases, the memory pages assigned to and/or used by the process may change as the process executes based on various conditions, such as the process requesting additional memory pages, the process accessing new memory pages, and/or the like. Moreover, an element of the process may decide to use/overwrite a memory page associated with another module in the same process, which may occur, for example, if the process is malicious.

In some cases, the memory pages assigned to a malicious process may provide a wealth of information about the malicious process, which may lead to improved artifact and intelligence gathering, and thus improved malware detection. However, a malware inspection tool (e.g., virtual sandbox environments, binary instrumentation tools, and/or the like) may insert malware inspection elements (e.g., libraries, executable scripts, dynamic-link libraries (DLLs), and/or the like) into the malicious process, which can make it difficult to determine which memory pages, assigned to the malicious process, are being used by the malicious process and which memory pages are being used by the malware inspection element, which decreases the efficacy of the malware inspection tool.

Some implementations described herein provide a device that is capable of identifying memory pages assigned to, and used by, a process, and reporting the memory pages to a malware inspection tool. For example, the device may be capable of including a malware inspection element and a memory tracking element in the process, and may be capable of using the memory tracking element to identify the memory pages assigned to, and used by the process, from the memory pages assigned to the process and used by the malware inspection element. The malware inspection tool may then inspect the memory pages assigned to, and used by the process, which improves artifact extraction from the process, which in turn increases malware detection accuracy and increases the extraction of indicators of compromise (IOCs) from the process.

FIGS. 1A-1D are diagrams of an example implementation 100 described herein. As shown in FIGS. 1A-1D, example implementation 100 may include an inspection platform. In some implementations, the inspection platform may include a server device, a user device (e.g., desktop computer, laptop computer, handheld computer or device, and/or the like), a network device, a cloud-based platform, and/or the like.

Figure 1A:
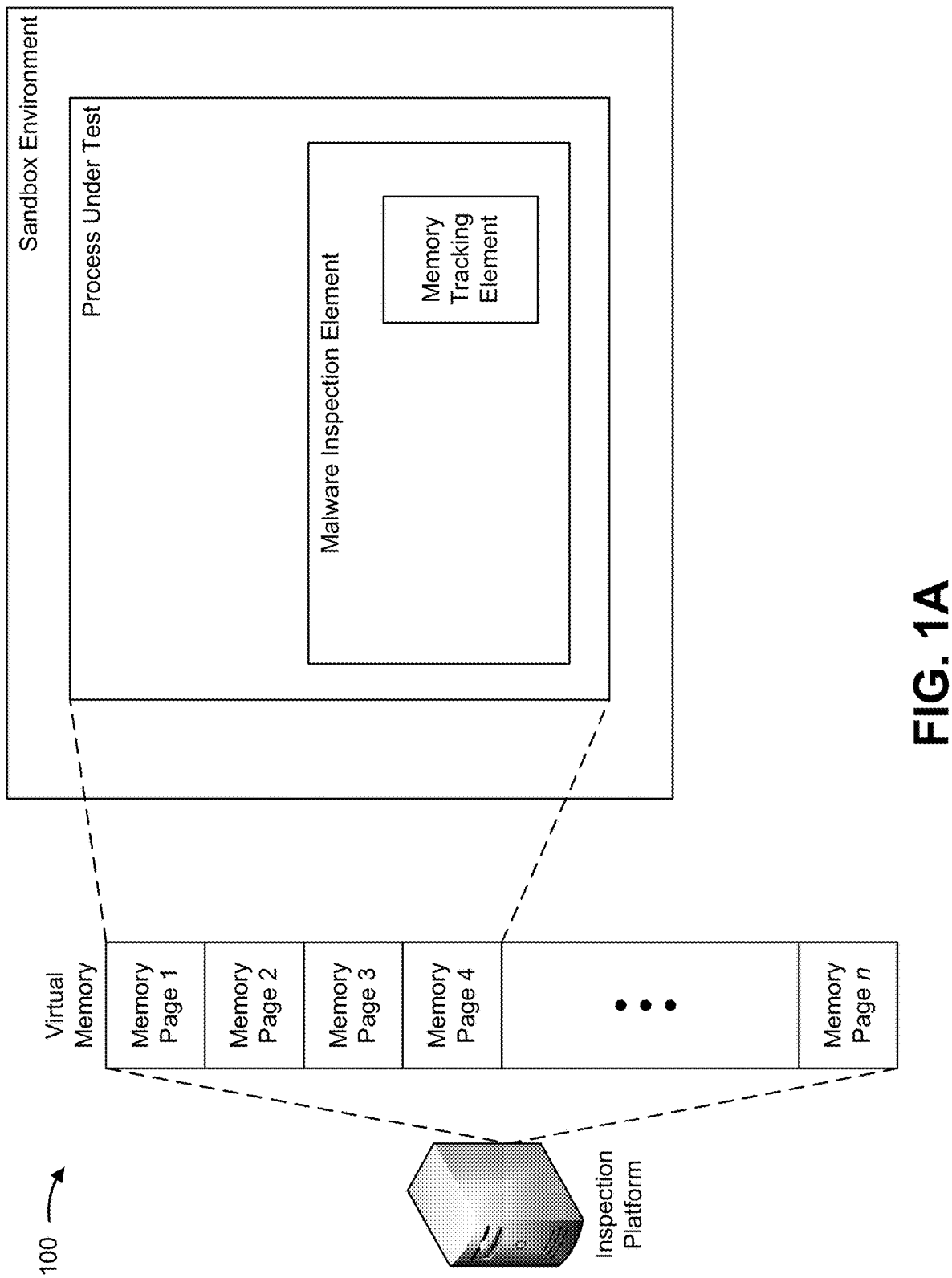
FIG. 1A-1D are diagrams of an example implementation described herein.

As shown in FIG. 1A, the inspection platform may include physical memory and/or physical storage that may be virtualized and presented as virtual memory. The virtual memory of the inspection platform may be segmented into a plurality of memory pages (e.g., memory page 1 through memory page n, where n>1, collectively referred to as "memory pages" and individually as "memory page"). While memory pages are used to describe implementation 100, other units for portions of the virtual memory may be used.

In some implementations, the inspection platform may assign one or more memory pages of the virtual memory to an application, a process, and/or the like, so that the application, the process, and/or the like, may be executed by a processor of the inspection platform (which may be referred to as detonating the process if the process is or suspected of being malicious). In some implementations, a process may be a software application, a software script, a software file, software code, a webpage address (e.g., a uniform resource locator (URL)) and/or another form of software that is executable by a processor.

In some implementations, the inspection platform may execute a process under test so that the inspection platform may analyze the process under test, as the process under test executes, to determine if the behavior of the process is malicious, such as if the process under test attempts to install a rootkit, attempts to install a backdoor, attempts to install spyware or adware, attempts to obtain personal information from a user, attempts to take over other portions of the virtual memory, and/or the like. In some implementations, the inspection platform may inspect the process under test based on receiving a request (e.g., from a user device, from a server device, from a network device, and/or the like) to inspect the process under test. For example, a user device, a server device, a network device, and/or the like may receive a file from an unknown and/or unverified source, and may transmit the file to the inspection platform along with an instruction to inspect the file. In some implementations, the user device, the server device, the network device, and/or the like may automatically transmit the file based on the user device, the server device, the network device, and/or the like downloading the file, based on the user device, the server device, the network device, and/or the like opening an attachment in an email, and/or the like. The inspection platform may inspect the file based on receiving the file and the request, and may transmit the results (e.g., an indicator of whether the file is malicious or safe, a detail report of the actions taken by the inspection platform during the inspection, information identifying the type of malicious behavior the file exhibits if the file is identified as malicious, and/or the like) of the inspection to the user device, the server device, the network device, and/or the like. In this way, the inspection platform may inspect the file for the user device, the server device, the network device, and/or the like, which prevents the user device, the server device, the network device, and/or the like from downloading and/or installing malware, which in turn improves the security of the user device, the server device, the network device, and/or the like. Moreover, in this way, the inspection of the file may be performed by the inspection platform instead of the user device, the server device, the network device, and/or the like, which conserves processing and/or memory resources of the user device, the server device, the network device, and/or the like, which in turn allows the processing and/or memory resources to be used for other purposes.

In some implementations, the inspection platform may execute the process under test in a sandbox environment. The sandbox environment may be a software application that may allow the inspection platform to execute the process under test in a manner that allows the inspection platform to control the resources (e.g., processing resources, memory resources, and/or the like) of the inspection platform that the process under test is allowed to use. In this way, if the process under test is malicious, the sandbox environment may prevent the process under test from causing harm to the inspection platform. However, the inspection platform may execute and analyze the process under test without the use of the sandbox environment.

To inspect the process under test, the inspection platform may insert a malware inspection element into the process under test as the process under test executes in the sandbox environment. The malware inspection element may include a library, an executable script, a DLL, and/or the like, that is capable of inspecting, tracking, and/or the like, resource usage of the process under test, actions performed by the process under test, and/or the like. The malware inspection element may be provided by, and associated with, a malware inspection tool, such as a binary instrumentation tool, the sandbox environment, and/or the like.

As explained above, the process under test and the malware inspection element may use various memory pages of the virtual memory included in the inspection platform. For example, as shown in FIG. 1A, the inspection platform may assign memory page 1 through memory page 4 for use by the process under test and the malware inspection element.

Moreover, as explained above, since the inspection platform inserted the malware inspection element into the process under test, it may be difficult for the inspection platform to determine which memory pages, of memory page 1 through memory page 4, are being used by the process under test, and which memory pages, of memory page 1 through memory page 4, are being used by the malware inspection element.

Accordingly, the inspection platform may insert a memory tracking element into the malware inspection element, into another portion of the process under test, and/or another location, prior to inserting the malware inspection element into the process under test. The memory tracking element may be a library, executable script, and/or the like, similar to the malware inspection element. In some implementations, the memory tracking element may track the memory page usage of the process under test, may generate a memory map for the process based on tracking the memory page usage of the process under test, may provide the memory map to the malware inspection tool, and/or the like.

Figure 1B:
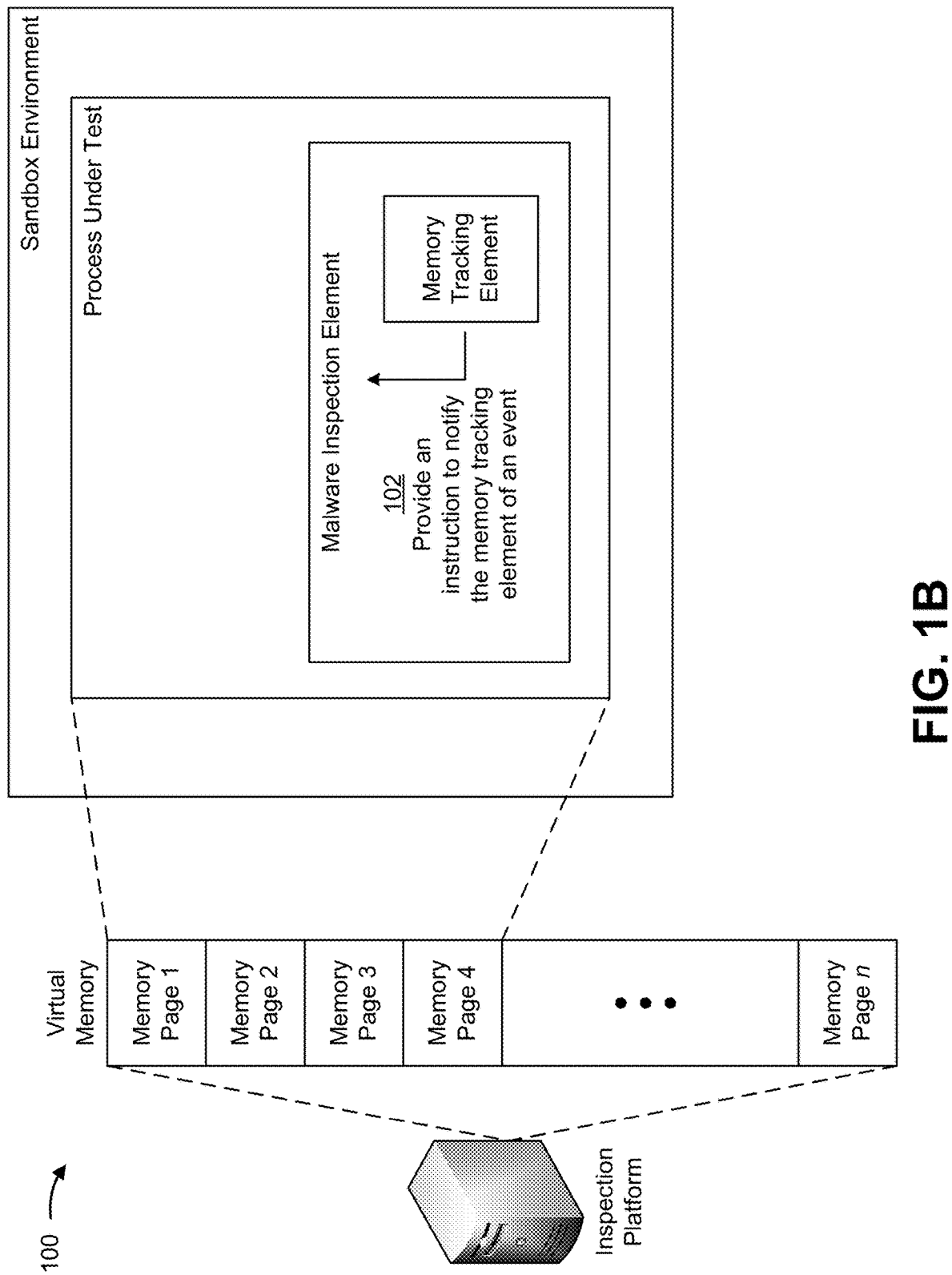

Turning to FIG. 1B, and as shown by reference number 102, to track the memory page usage of the process under test, the memory tracking element may provide an instruction to the malware inspection element to notify the memory tracking element of various events associated with the process under test. In some implementations, the memory tracking element may provide the instruction to the malware inspection element via an interface such as an application programming interface (API).

The various events may be indicators of the memory pages being used by the process under test. For example, the various events may include the process under test being loaded into the virtual memory and executed by the processor associated with the inspection platform, a memory operation associated with the process under test (e.g., a memory read operation associated with the process under test, a memory write operation associated with the process under test, and/or the like), a change to a memory page associated with the process under test (e.g., one or more new memory pages being associated with the process under test), an instruction being executed by the process under test, and/or the like. In this way, the memory tracking element may use notifications of events to generate a mapping table of memory pages assigned to, and being used by, the process under test.

Figure 1C:
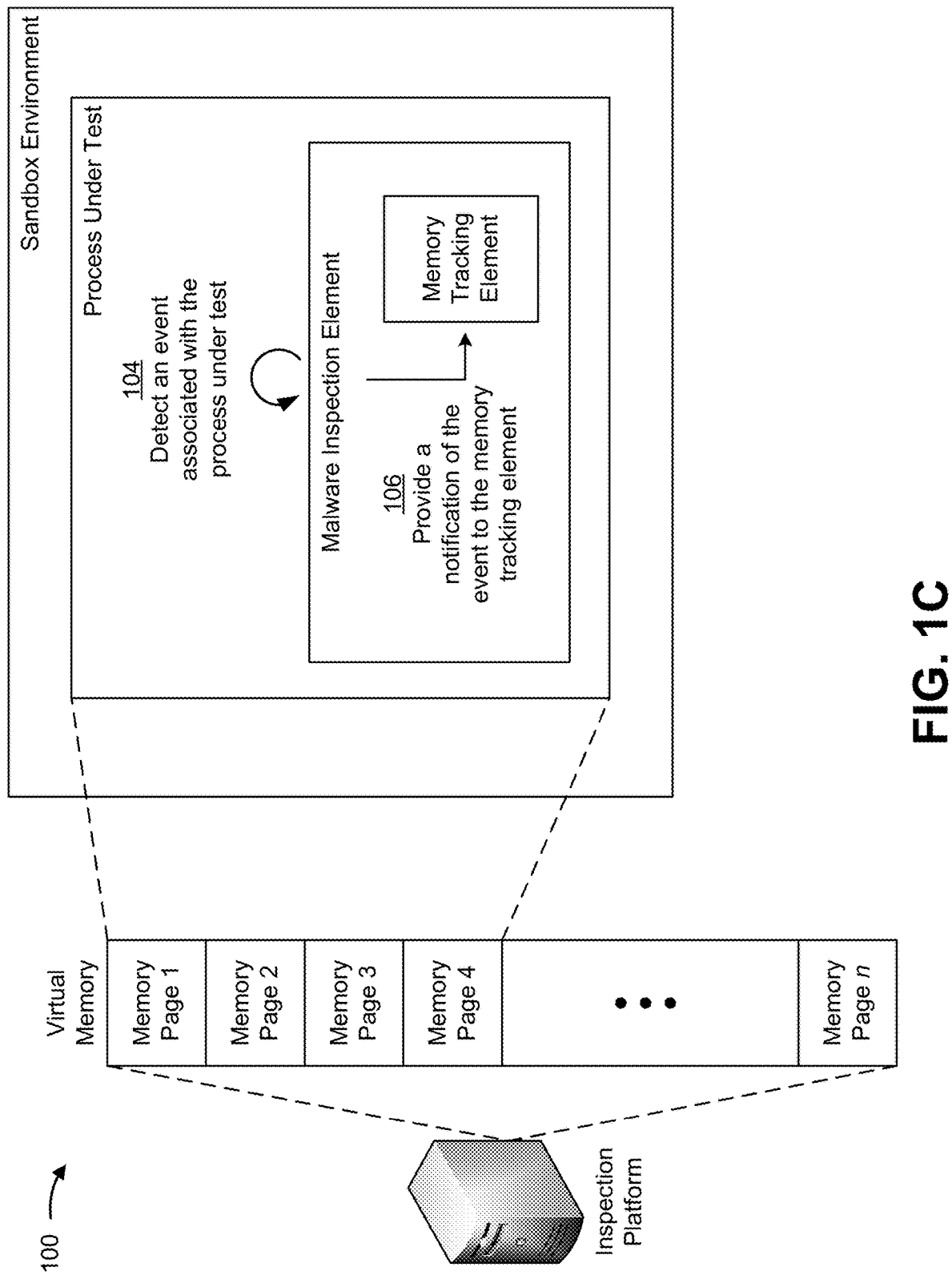

Turning to FIG. 1C, in some implementations, the inspection platform may load the process under test into the virtual memory. As shown by reference number 104, the malware inspection element may detect an event associated with the process under test that has been loaded into the virtual memory. For example, the malware inspection element may detect any of the events, associated with the process under test, described above and/or other events. As shown by reference number 106, based on detecting the event associated with the process under test, the malware inspection element may provide a notification of the event to the memory tracking element. In some implementations, the notification may include information associated with the event, such as information identifying the event, information identifying one or more memory pages associated with the event, and/or the like. For example, a notification associated with the process under test performing a memory read of memory page 1 may include information identifying the event as a memory read (e.g., a description specifying that the event was a memory read, an identifier associated with memory read events, and/or the like), information identifying memory page 1, and/or the like. As another example, a notification associated with the process under test being loaded into the virtual memory and executed by the processor of the inspection platform may include information identifying the event as the process under test being loaded into the virtual memory and executed by the processor, information identifying a memory page range of where in the virtual memory the process under test is loaded (e.g., information identifying memory page 1 through memory page 4), and/or the like. As a further example, a notification associated with the process under test being assigned one or more new memory pages (e.g., using an application programming interface (API) such as VirtualAlloc, VirtualAllocEx, malloc, GlobalAllloc, HeapAlloc, LocalAlloc, CoTaskMemAlloc, and/or the like) may include information identifying the event as the process under test being assigned the new one or more memory pages, information identifying the one or more memory pages, and/or the like. As a further example, a notification associated with the process under test executing an instruction may include information identifying the event as the process under test executing the instruction, information identifying one or more memory pages associated with the instruction (e.g., the one or more memory pages storing the instruction), and/or the like.

Figure 1D:
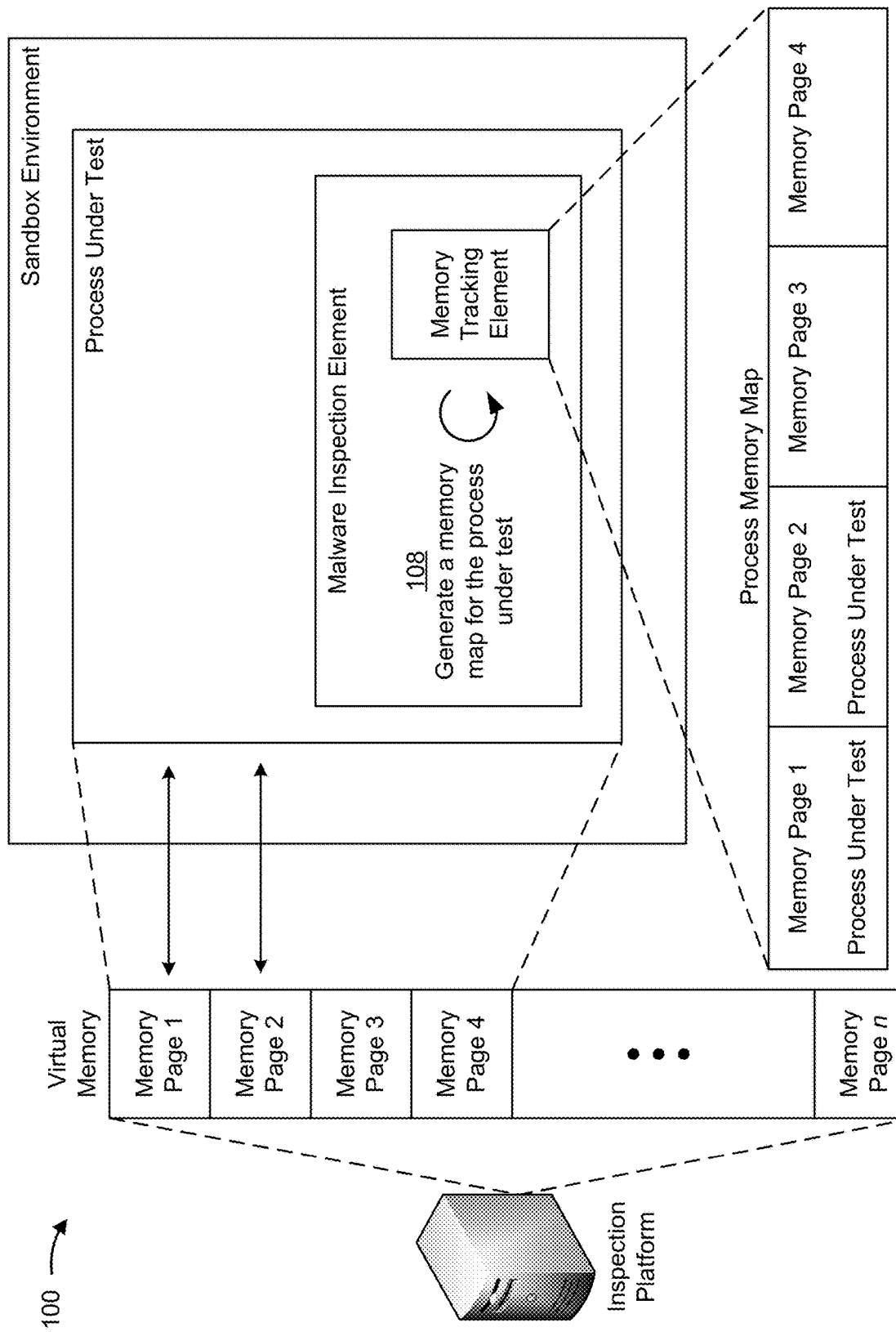

Turning to FIG. 1D, the memory tracking element may receive, from the malware inspection element, the notification of the event associated with the process under test. For example, the memory tracking element may receive the notification of the event from the malware inspection element via an API.

As shown by reference number 108, the memory tracking element may generate, based on receiving the notification, a memory map associated with the process under test. The memory map may include information identifying the memory page range assigned to the process under test, the memory pages being used by the process under test, and/or the like. For example, the memory tracking element may generate the memory map based on receiving a notification associated with the process under test being loaded in the virtual memory included in the inspection platform by including, in the memory map, information identifying the memory map range, assigned to the process under test, identified in the notification. In some implementations, based on receiving the notification associated with the process under test being loaded in the virtual memory, the memory tracking element may transmit a request to the malware inspection element for the information identifying the memory map range, and the malware inspection element may provide the information to the memory tracking element based on receiving the request.

As another example, the memory tracking element may generate the memory map based on receiving a notification associated with a memory operation performed by the process under test by including, in the memory map, information indicating that the process under test used the memory page identified in the notification. In some implementations, based on receiving the notification associated with a memory operation performed by the process under test, the memory tracking element may transmit a request to the malware inspection element for the information identifying the memory page associated with the memory operation, and the malware inspection element may provide the information to the memory tracking element based on receiving the request.

As a further example, the memory tracking element may generate the memory map based on receiving a notification associated with a new memory page being assigned to the process under test by including, in the memory map, information identifying the new memory map identified in the notification. In some implementations, based on receiving the notification associated with the new memory page being assigned to the process under test, the memory tracking element may transmit a request to the malware inspection element for the information identifying the new memory page assigned to the process under test, and the malware inspection element may provide the information to the memory tracking element based on receiving the request.

In some implementations, the memory tracking element may include, in the memory map, information indicating that the memory pages, included in the memory page range associated with the process under test, that have not been identified as being used by the process under test, are not being used by the process under test, are being used by the malware inspection element, and/or the like. In some implementations, the memory tracking element may not include any additional information, in the memory map, associated with the memory pages that are not being used by the process under test.

In some implementations, the memory tracking element may track the memory pages identified in the memory map. For example, the memory tracking element may track the state held by the memory pages, may identify artifacts, IOCs and/or other information, included in the memory pages, that may aid in determining that the process under test is malicious or not malicious, and/or the like. In some implementations, the memory tracking element may provide the memory map associated with the process under test, and/or any identified artifacts, IOCs, and other information, to the malware inspection tool for forensic analysis so that the malware inspection tool may use the memory map to further inspect the process under test to determine whether the process under test exhibits malicious behavior (and therefore can be identified as malware), determine the intent of the process under test if the process under test is malicious (e.g., the malicious intent the process under test has been designed to achieve), and/or the like. For example, the malware inspection tool may identify artifacts (e.g., indicators of malicious behavior) by inspecting the memory pages identified in the memory map to identify information stored in the memory pages (e.g., to determine whether the process under test stored a malicious URL, information identifying an Internet protocol address, information identifying a ransomware node, unpacked or encrypted code, and/or other types of malicious content, in a memory page identified in the memory map), by monitoring the process under test's usage of the memory pages (e.g., tracking a quantity of times the process under test performs a write or a read operation associated with the memory pages, tracking whether, and a quantity of times, the process under test overwrites data in the memory pages), by monitoring for the process under test requesting additional memory pages, and/or the like.

In this way, the memory tracking element may identify and track the memory pages assigned to, and used by, the process under test so that the memory pages used by the malware inspection element is not taken into consideration when the malware inspection tool inspects the process under test. This increases the ability of the malware inspection tool and/or the inspection platform to identify, track, and/or monitor malicious processes, which in turn increases computer and network security. Moreover, this conserves memory and/or processing resources of the inspection platform that would have otherwise been used to track an analyze memory pages (i.e., the memory pages used by the malware inspection element) that may be irrelevant to inspection of the process under test.

If inspection platform determines, based on inspecting the process under test, that the process under test is malicious, the inspection platform may perform various actions, such as quarantining the process under test so that the process under test does not infect areas of the inspection platform outside of the sandbox environment and/or other devices, providing a report (e.g., to a user device, to server device, to a network device, and/or the like) that includes information associated with the process under test and/or the inspection of the process under test, automatically attempting to identify actions that may be performed to prevent the process under test from taking malicious actions so that the actions can be provided, for example, in a security bulletin or notification, attempting to remove the malicious aspects from the process under test so that the process under test may be used for non-malicious purposes, and/or the like.

As indicated above, FIGS. 1A-1D are provided merely as an example. Other examples are possible and may differ from what was described with regard to FIGS. 1A-1D.

Figure 2:
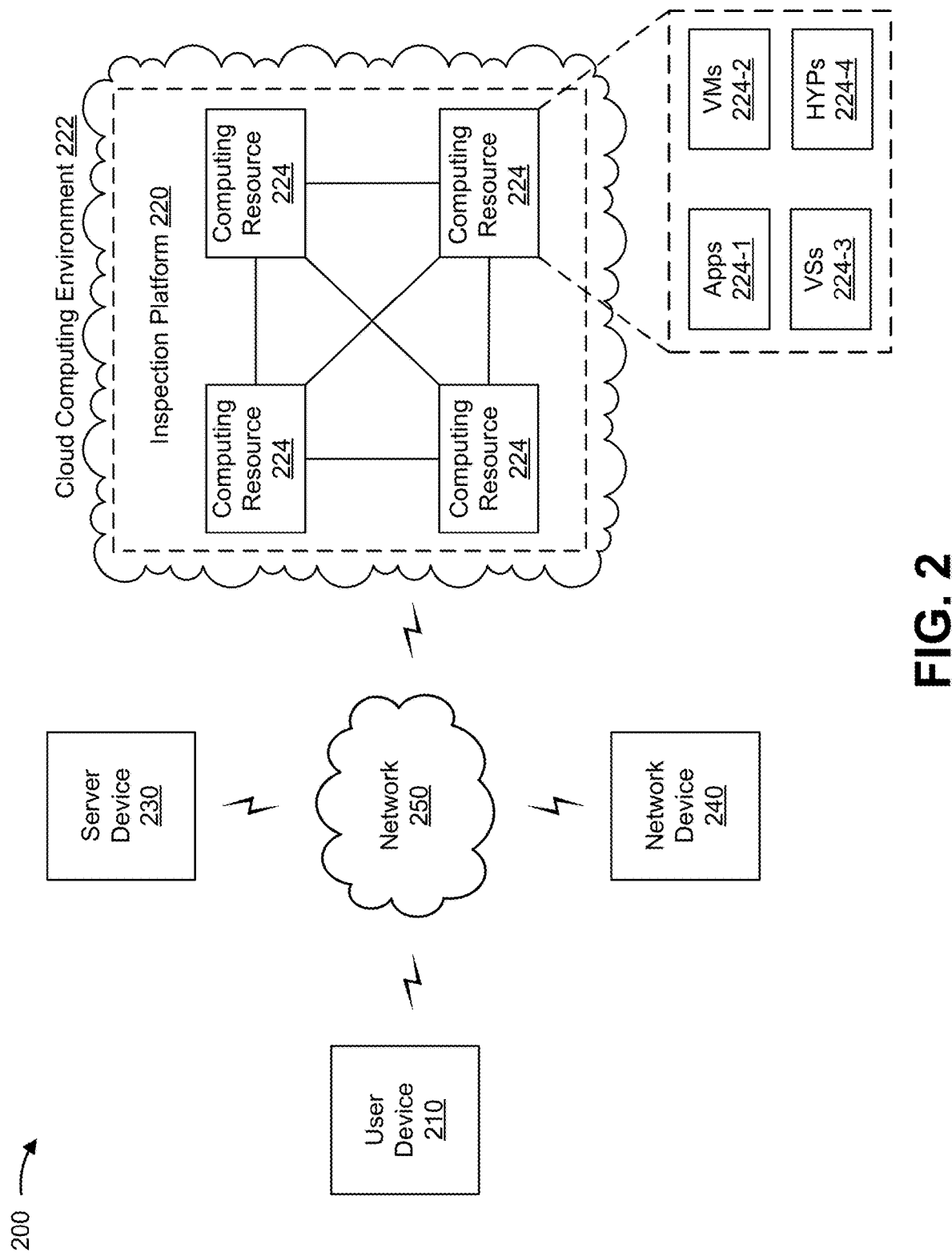
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an inspection platform 220 in a cloud computing environment 222 that includes a set of computing resources 224, a server device 230, network device 240, and a network 250. Devices of environment 200 may interconnect via wired connections, wireless connections, or a combination of wired and wireless connections.

User device 210 includes one or more devices capable of receiving, generating, storing, processing, and/or providing data associated with memory tracking for malware detection. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device.

In some implementations, user device 210 may inspect a process under test by loading the process under test into virtual memory associated with user device 210, inserting various elements into the process under test, such as a malware inspection element associated with a malware inspection tool, a memory tracking element, and/or the like, using the memory tracking element to track memory pages assigned to, and used by the process under test, generating a memory map of the memory pages assigned to, and used by the process under test, and/or the like. In some implementations, user device 210 may provide, to inspection platform 220, a file to be inspected and an instruction, a request, and/or the like, to perform malware inspection of the file.

In some implementations, inspection platform 220 may perform inspection of a process for user device 210. Accordingly, user device 210 may identify the process to be tested, and may provide an instruction to inspection platform 220, which may inspect the process based on receiving the process and the request, and may transmit the results of the inspection (e.g., an indicator of whether the process is malicious or safe, a detail report of the actions taken by the inspection platform during the inspection, information identifying the type of malicious behavior the process exhibits if the process is identified as malicious, and/or the like) to user device 210. In this way, inspection platform 220 may inspect the process for user device 210, which prevents user device 210 from downloading and/or installing malware, which in turn improves the security of user device 210. Moreover, in this way, the inspection of the process may be performed by inspection platform 220 instead of user device 210, which conserves processing and/or memory resources of user device 210, which in turn allows the processing and/or memory resources to be used for other purposes.

Inspection platform 220 includes one or more devices capable of receiving, generating, storing, processing, and/or providing data associated with memory tracking for malware detection. For example, inspection platform 220 may load a process under test into virtual memory associated with inspection platform, may insert various elements into the process under test, such as a malware inspection element associated with a malware inspection tool, a memory tracking element, and/or the like, may use the memory tracking element to track memory pages assigned to, and used by the process under test, may generate a memory map of the memory pages assigned to, and used by the process under test, may provide the memory map to user device 210, to server device 230, to network device 240, and/or the like. In some implementations, as shown, inspection platform 220 may be hosted in cloud computing environment 222. Notably, while implementations described herein describe inspection platform 220 as being hosted in cloud computing environment 222, in some implementations, inspection platform 220 may not be cloud-based (i.e., may be implemented outside of a cloud computing environment) or may be partially cloud-based.

Cloud computing environment 222 includes an environment that hosts inspection platform 220. Cloud computing environment 222 may provide computation, software, data access, storage, and/or other services. As shown, cloud computing environment 222 may include a group of computing resources 224 (referred to collectively as "computing resources 224" and individually as "computing resource 224").

Computing resource 224 includes one or more personal computers, workstation computers, server devices, or another type of computation and/or communication device. In some implementations, computing resource 224 may host inspection platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, one or more virtualized storages ("VSs") 224-3, or one or more hypervisors ("HYPs") 224-4.

Application 224-1 includes one or more software applications that may be provided to or accessed by one or more devices of environment 200. Application 224-1 may eliminate a need to install and execute the software applications on devices of environment 200. For example, application 224-1 may include software associated with inspection platform 220 and/or any other software capable of being provided via cloud computing environment 222. In some implementations, one application 224-1 may send/receive information to/from one or more other applications 224-1, via virtual machine 224-2. In some implementations, application 224-1 may include a software application associated with one or more databases and/or operating systems. For example, application 224-1 may include an enterprise application, a functional application, an analytics application, and/or the like.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210, a user of server device 230, a user of network device 240, and/or the like), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Server device 230 includes one or more devices capable of receiving, generating, storing, processing, and/or providing data associated with memory tracking for malware detection. In some implementations, server device 230 may include a stand-alone server, a rack-mountable server, a blade server, a data center, a virtualized server, a plurality of servers, and/or the like. In some implementations, server device 230 may inspect a process under test by loading the process under test into virtual memory associated with server device 230, inserting various elements into the process under test, such as a malware inspection element associated with a malware inspection tool, a memory tracking element, and/or the like, using the memory tracking element to track memory pages assigned to, and used by the process under test, generating a memory map of the memory pages assigned to, and used by the process under test, and/or the like. In some implementations, server device 230 may provide, to inspection platform 220, a file to be inspected and an instruction, a request, and/or the like, to perform malware inspection of the file.

Network device 240 includes one or more devices capable of receiving, generating, storing, processing, and/or providing data associated with memory tracking for malware detection. In some implementations, network device 240 may include a firewall, a router, a gateway, a switch, a bridge, a wireless access point, a base station (e.g., eNodeB, NodeB, gNodeB, and/or the like), and/or the like. In some implementations, network device 240 may be implemented as a physical device implemented within a housing, such as a chassis. In some implementations, network device 240 may be implemented as a virtual device implemented by one or more computer devices of a cloud computing environment or a data center.

In some implementations, network device 240 may inspect a process under test by loading the process under test into virtual memory associated with network device 240, inserting various elements into the process under test, such as a malware inspection element associated with a malware inspection tool, a memory tracking element, and/or the like, using the memory tracking element to track memory pages assigned to, and used by the process under test, generating a memory map of the memory pages assigned to, and used by the process under test, and/or the like. In some implementations, network device 240 may provide, to inspection platform 220, a file to be inspected and an instruction, a request, and/or the like, to perform malware inspection of the file.

Network 250 includes one or more wired and/or wireless networks. For example, network 250 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
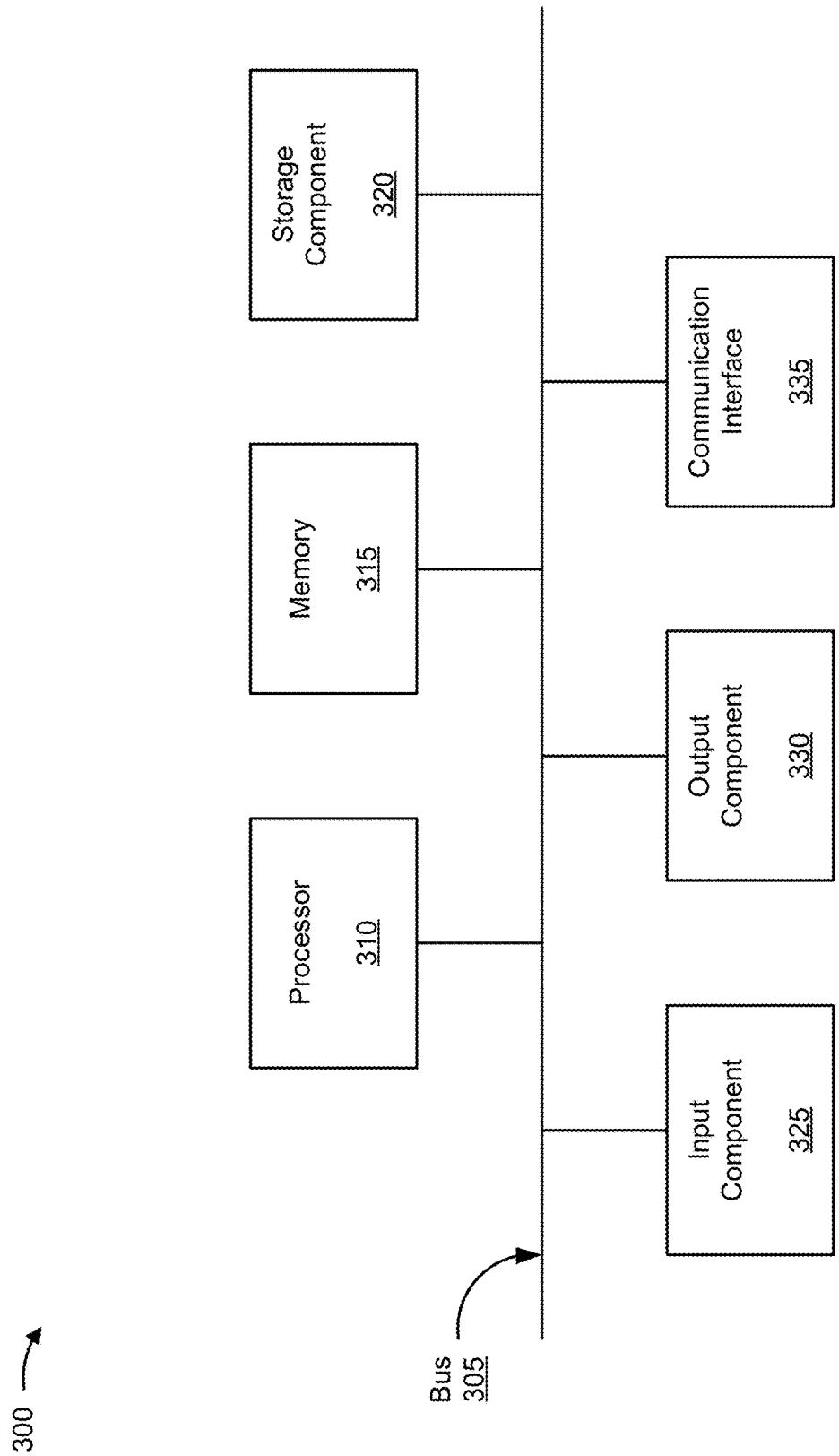
FIGS. 3A and 3B are diagrams of example components of one or more devices of FIG. 2.
Figure 3B:
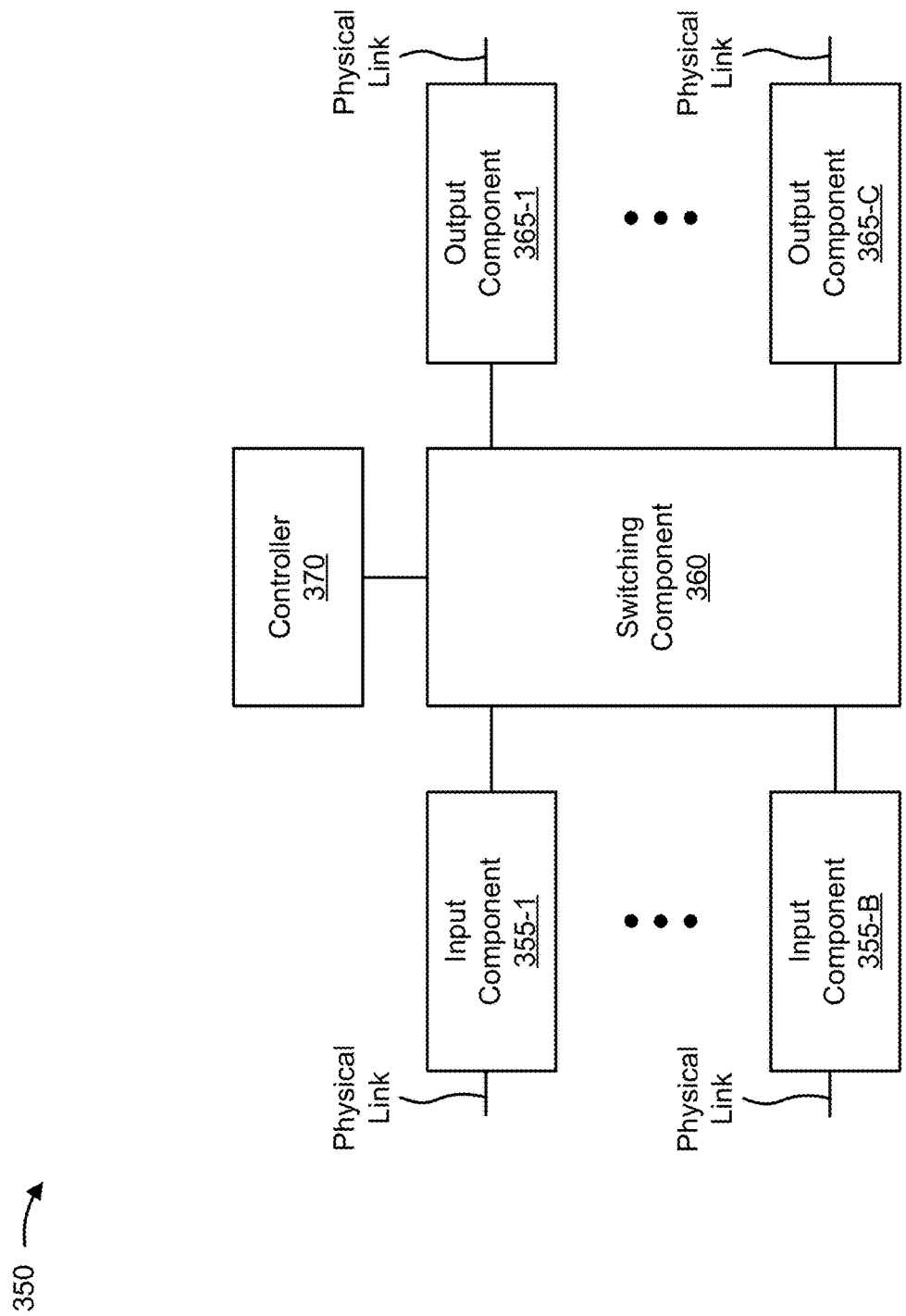

FIGS. 3A and 3B are diagrams of example components of one or more devices of FIG. 2. FIG. 3A is a diagram of example components of a device 300. Device 300 may correspond to user device 210, inspection platform 220, server device 230, and/or the like. In some implementations, user device 210, inspection platform 220, server device 230, and/or the like, may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RANI), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to inspection platform 220, network device 240, and/or the like. In some implementations, inspection platform 220, network device 240, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
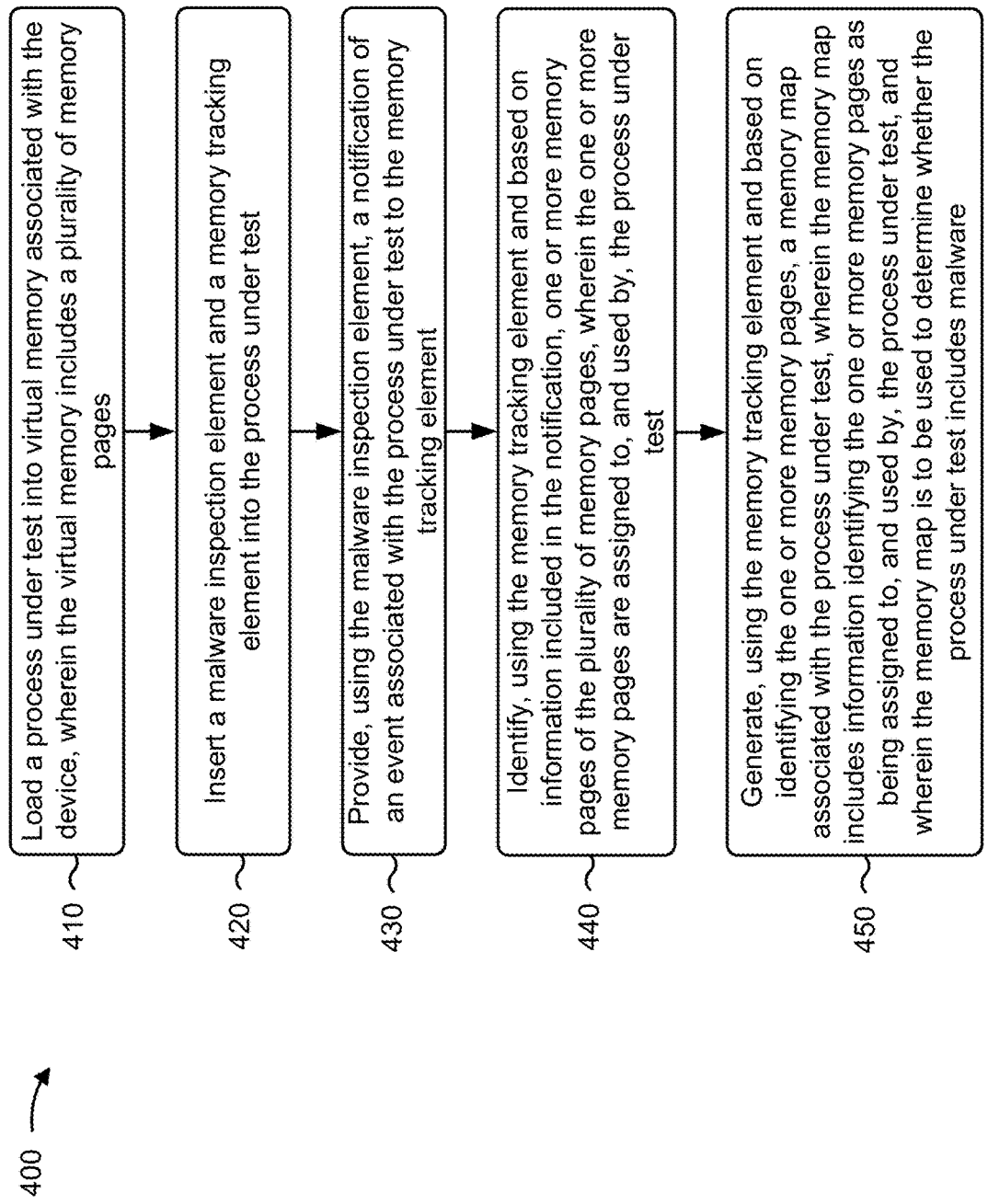
FIG. 4 is a flow chart of an example process for memory tracking for malware detection.

FIG. 4 is a flow chart of an example process 400 for memory tracking for malware detection. In some implementations, one or more process blocks of FIG. 4 may be performed by a device such as an inspection platform (e.g., inspection platform 220). In some implementations, one or more process blocks of FIG. 4 may be performed by another device or a group of devices separate from or including the inspection platform, such as a user device (e.g., user device 210), a server device (e.g., server device 230), a network device (e.g., a network device 240), and/or the like.

As shown in FIG. 4, process 400 may include loading a process under test into virtual memory associated with the inspection platform, wherein the virtual memory includes a plurality of memory pages (block 410). For example, the inspection platform (e.g., using computing resource 224, processor 310, memory 315, storage component 320, input component 325, output component 330, communication interface 335, input component 355, switching component 360, output component 365, controller 370, and/or the like) may load a process under test into virtual memory associated with the inspection platform, as described above in connection with FIGS. 1A-1D. In some implementations, the virtual memory may include a plurality of memory pages.

As further shown in FIG. 4, process 400 may include inserting a malware inspection element and a memory tracking element into the process under test (block 420). For example, the inspection platform (e.g., using computing resource 224, processor 310, memory 315, storage component 320, input component 325, output component 330, communication interface 335, input component 355, switching component 360, output component 365, controller 370, and/or the like) may insert a malware inspection element and a memory tracking element into the process under test, as described above in connection with FIGS. 1A-1D.

As further shown in FIG. 4, process 400 may include providing, using the malware inspection element, a notification of an event associated with the process under test to the memory tracking element (block 430). For example, the inspection platform (e.g., using computing resource 224, processor 310, memory 315, storage component 320, input component 325, output component 330, communication interface 335, input component 355, switching component 360, output component 365, controller 370, and/or the like) may provide, using the malware inspection element, a notification of an event associated with the process under test to the memory tracking element, as described above in connection with FIGS. 1A-1D.

As further shown in FIG. 4, process 400 may include identifying, using the memory tracking element and based on information included in the notification, one or more memory pages of the plurality of memory pages, wherein the one or more memory pages are assigned to, and used by, the process under test (block 440). For example, the inspection platform (e.g., using computing resource 224, processor 310, memory 315, storage component 320, input component 325, output component 330, communication interface 335, input component 355, switching component 360, output component 365, controller 370, and/or the like) may identify, using the memory tracking element and based on information included in the notification, one or more memory pages of the plurality of memory pages, as described above in connection with FIGS. 1A-1D. In some implementations, the one or more memory pages may be assigned to, and used by, the process under test.

As further shown in FIG. 4, process 400 may include generating, using the memory tracking element and based on identifying the one or more memory pages, a memory map associated with the process under test, wherein the memory map includes information identifying the one or more memory pages as being assigned to, and used by, the process under test, and wherein the memory map is to be used to determine whether the process under test includes malware (block 450). For example, the inspection platform (e.g., using computing resource 224, processor 310, memory 315, storage component 320, input component 325, output component 330, communication interface 335, input component 355, switching component 360, output component 365, controller 370, and/or the like) may generate, using the memory tracking element and based on identifying the one or more memory pages, a memory map associated with the process under test, as described above in connection with FIGS. 1A-1D. In some implementations, the memory map may include information identifying the one or more memory pages as being assigned to, and used by, the process under test. In some implementations, the memory map may be used to determine whether the process under test includes malware.

Process 400 may include additional implementations, such as any single implementation or any combination of implementations described below and/or described with regard to any other process described herein.

In some implementations, the inspection platform may provide, using the memory tracking element, an instruction, to the malware inspection element, to provide the memory tracking element with the notification of the event associated with the process under test. In some implementations, the event may include the process under test being assigned a new memory page via an application programming interface (API).

In some implementations, the inspection platform may detect, using the malware inspection element, the process under test being loaded into the virtual memory, wherein the notification of the event associated with the process under test comprises information indicating that the process under test has been loaded into the virtual memory and information identifying a memory page range assigned to the process under test, and the inspection platform may, when identifying the one or more memory pages of the plurality of memory pages, identify the memory page range identified in the notification.

In some implementations, the inspection platform may track, using the memory tracking element and using the memory map, the one or more memory pages. In some implementations, the inspection platform, when tracking the one or more memory pages, may track a state held by the one or more memory pages, extract an artifact from the one or more memory pages, identify an indicator of compromise (IOC) of the process under test based on the one or more memory pages, and/or the like. In some implementations, the inspection platform may provide, to a malware inspection tool, the artifact for forensic analysis to determine a malicious intent of the process under test.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
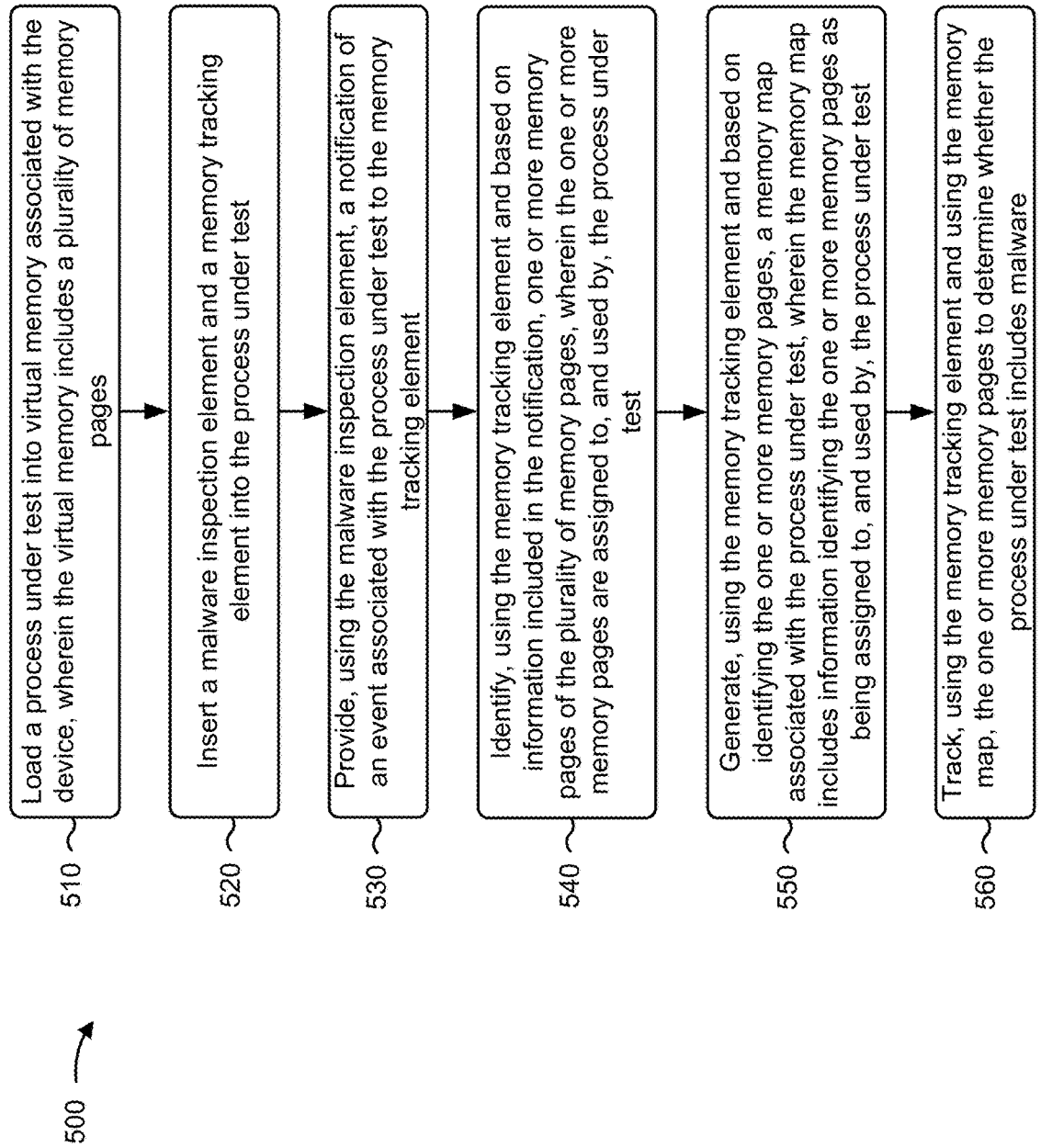
FIG. 5 is a flow chart of an example process for memory tracking for malware detection.

FIG. 5 is a flow chart of an example process 500 for memory tracking for malware detection. In some implementations, one or more process blocks of FIG. 5 may be performed by a device such as an inspection platform (e.g., inspection platform 220). In some implementations, one or more process blocks of FIG. 5 may be performed by another device or a group of devices separate from or including the inspection platform, such as a user device (e.g., user device 210), a server device (e.g., server device 230), a network device (e.g., a network device 240), and/or the like.

As shown in FIG. 5, process 500 may include loading a process under test into virtual memory associated with the inspection platform, wherein the virtual memory includes a plurality of memory pages (block 510). For example, the inspection platform (e.g., using computing resource 224, processor 310, memory 315, storage component 320, input component 325, output component 330, communication interface 335, input component 355, switching component 360, output component 365, controller 370, and/or the like) may load a process under test into virtual memory associated with the inspection platform as described above in connection with FIGS. 1A-1D. In some implementations, the virtual memory may include a plurality of memory pages.

As further shown in FIG. 5, process 500 may include inserting a malware inspection element and a memory tracking element into the process under test (block 520). For example, the inspection platform (e.g., using computing resource 224, processor 310, memory 315, storage component 320, input component 325, output component 330, communication interface 335, input component 355, switching component 360, output component 365, controller 370, and/or the like) may insert a malware inspection element and a memory tracking element into the process under test, as described above in connection with FIGS. 1A-1D.

As further shown in FIG. 5, process 500 may include providing, using the malware inspection element, a notification of an event associated with the process under test to the memory tracking element (block 530). For example, the inspection platform (e.g., using computing resource 224, processor 310, memory 315, storage component 320, input component 325, output component 330, communication interface 335, input component 355, switching component 360, output component 365, controller 370, and/or the like) may provide, using the malware inspection element, a notification of an event associated with the process under test to the memory tracking element, as described above in connection with FIGS. 1A-1D.

As further shown in FIG. 5, process 500 may include identifying, using the memory tracking element and based on information included in the notification, one or more memory pages of the plurality of memory pages, wherein the one or more memory pages are assigned to, and used by, the process under test (block 540). For example, the inspection platform (e.g., using computing resource 224, processor 310, memory 315, storage component 320, input component 325, output component 330, communication interface 335, input component 355, switching component 360, output component 365, controller 370, and/or the like) may identify, using the memory tracking element and based on information included in the notification, one or more memory pages of the plurality of memory pages, as described above in connection with FIGS. 1A-1D. In some implementations, the one or more memory pages may be assigned to, and used by, the process under test.

As further shown in FIG. 5, process 500 may include generating, using the memory tracking element and based on identifying the one or more memory pages, a memory map associated with the process under test, wherein the memory map includes information identifying the one or more memory pages as being assigned to, and used by, the process under test (block 550). For example, the inspection platform (e.g., using computing resource 224, processor 310, memory 315, storage component 320, input component 325, output component 330, communication interface 335, input component 355, switching component 360, output component 365, controller 370, and/or the like) may generate, using the memory tracking element and based on identifying the one or more memory pages, a memory map associated with the process under test, as described above in connection with FIGS. 1A-1D. In some implementations, the memory map may include information identifying the one or more memory pages as being assigned to, and used by, the process under test.

As further shown in FIG. 5, process 500 may include tracking, using the memory tracking element and using the memory map, the one or more memory pages to determine whether the process under test includes malware (block 560). For example, the inspection platform (e.g., using computing resource 224, processor 310, memory 315, storage component 320, input component 325, output component 330, communication interface 335, input component 355, switching component 360, output component 365, controller 370, and/or the like) may track, using the memory tracking element and using the memory map, the one or more memory pages to determine whether the process under test includes malware, as described above in connection with FIGS. 1A-1D.

Process 500 may include additional implementations, such as any single implementation or any combination of implementations described below and/or described with regard to any other process described herein.

In some implementations, the event may include at least one of a memory read operation associated with the process under test, a memory write operation associated with the process under test, the process under test being assigned a new memory page, and/or the like. In some implementations, the inspection platform may provide, using the memory tracking element, the memory map to a malware inspection tool associated with the malware inspection element. In some implementations, when providing the notification of the event associated with the process under test to the memory tracking element, the inspection platform may provide the notification of the event to the memory tracking element via an application programming interface (API).

In some implementations, the memory map may include information identifying a memory page range assigned to the process under test. In some implementations, the memory map may include information identifying one or more other memory pages that are assigned to, and used by, the malware inspection element. In some implementations, when tracking the one or more memory pages, the inspection platform may inspect the one or more memory pages to determine whether the process under test stored malicious content in the one or more memory pages, monitor usage of the one or more memory pages by the process under test, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
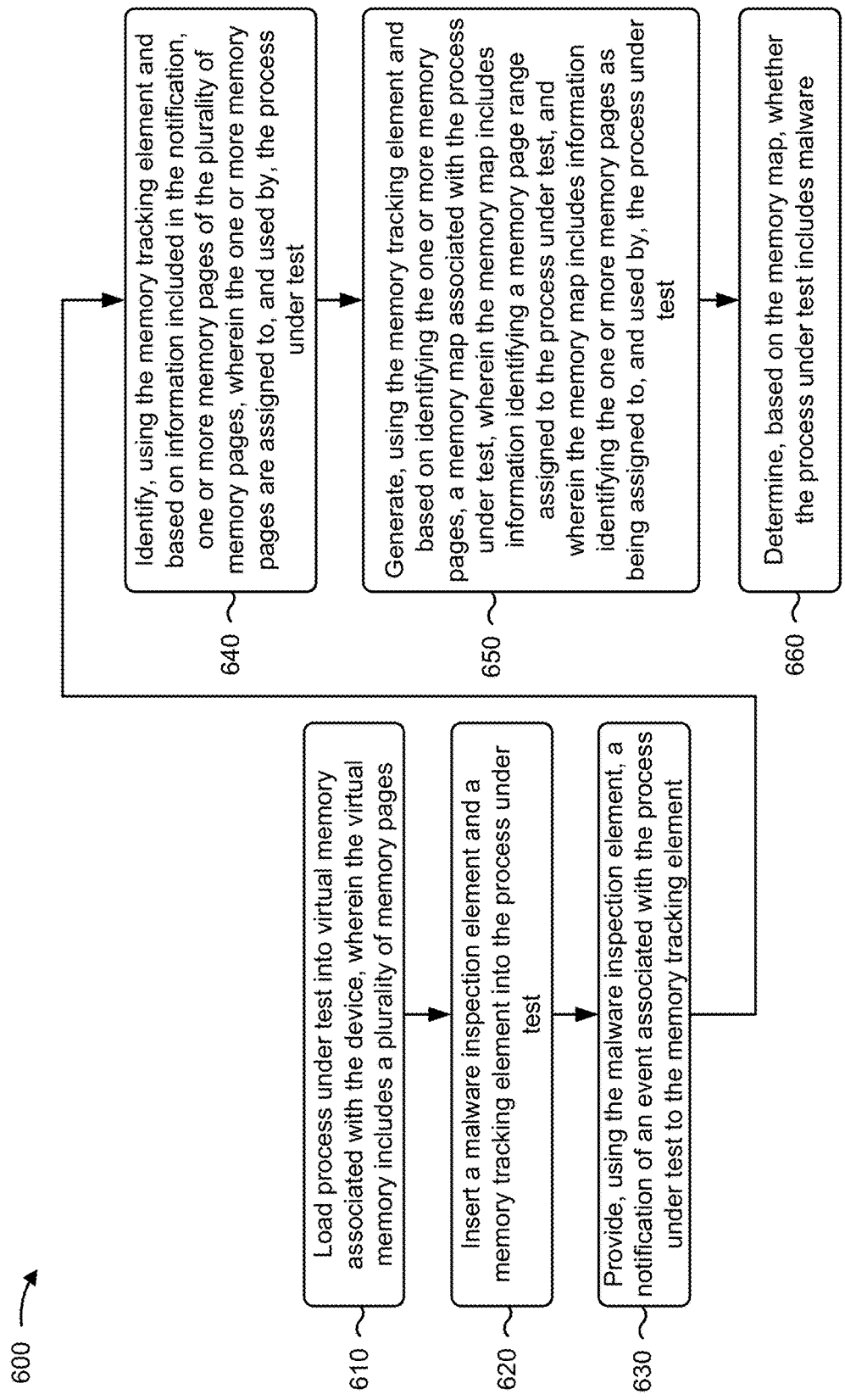
FIG. 6 is a flow chart of an example process for memory tracking for malware detection.

FIG. 6 is a flow chart of an example process 600 for memory tracking for malware detection. In some implementations, one or more process blocks of FIG. 6 may be performed by a device such as an inspection platform (e.g., inspection platform 220). In some implementations, one or more process blocks of FIG. 6 may be performed by another device or a group of devices separate from or including the inspection platform, such as a user device (e.g., user device 210), a server device (e.g., server device 230), a network device (e.g., a network device 240), and/or the like.

As shown in FIG. 6, process 600 may include loading a process under test into virtual memory associated with the inspection platform, wherein the virtual memory includes a plurality of memory pages (block 610). For example, the inspection platform (e.g., using computing resource 224, processor 310, memory 315, storage component 320, input component 325, output component 330, communication interface 335, input component 355, switching component 360, output component 365, controller 370, and/or the like) may load a process under test into virtual memory associated with the inspection platform, as described above in connection with FIGS. 1A-1D. In some implementations, the virtual memory may include a plurality of memory pages.

As further shown in FIG. 6, process 600 may inserting a malware inspection element and a memory tracking element into the process under test (block 620). For example, the inspection platform (e.g., using computing resource 224, processor 310, memory 315, storage component 320, input component 325, output component 330, communication interface 335, input component 355, switching component 360, output component 365, controller 370, and/or the like) may insert a malware inspection element and a memory tracking element into the process under test, as described above in connection with FIGS. 1A-1D.

As further shown in FIG. 6, process 600 may include providing, using the malware inspection element, a notification of an event associated with the process under test to the memory tracking element (block 630). For example, the inspection platform (e.g., using computing resource 224, processor 310, memory 315, storage component 320, input component 325, output component 330, communication interface 335, input component 355, switching component 360, output component 365, controller 370, and/or the like) may provide, using the malware inspection element, a notification of an event associated with the process under test to the memory tracking element, as described above in connection with FIGS. 1A-1D.

As further shown in FIG. 6, process 600 may include identifying, using the memory tracking element and based on information included in the notification, one or more memory pages of the plurality of memory pages, wherein the one or more memory pages are assigned to, and used by, the process under test (block 640). For example, the inspection platform (e.g., using computing resource 224, processor 310, memory 315, storage component 320, input component 325, output component 330, communication interface 335, input component 355, switching component 360, output component 365, controller 370, and/or the like) may identify, using the memory tracking element and based on information included in the notification, one or more memory pages of the plurality of memory pages, as described above in connection with FIGS. 1A-1D. In some implementations, the one or more memory pages may be assigned to, and used by, the process under test.

As further shown in FIG. 6, process 600 may include generating, using the memory tracking element and based on identifying the one or more memory pages, a memory map associated with the process under test, wherein the memory map includes information identifying a memory page range assigned to the process under test, and wherein the memory map includes information identifying the one or more memory pages as being assigned to, and used by, the process under test (block 650). For example, the inspection platform (e.g., using computing resource 224, processor 310, memory 315, storage component 320, input component 325, output component 330, communication interface 335, input component 355, switching component 360, output component 365, controller 370, and/or the like) may generate, using the memory tracking element and based on identifying the one or more memory pages, a memory map associated with the process under test, as described above in connection with FIGS. 1A-1D. In some implementations, the memory map may include information identifying a memory page range assigned to the process under test. In some implementations, the memory map may include information identifying the one or more memory pages as being assigned to, and used by, the process under test.

As further shown in FIG. 6, process 600 may include determining, based on the memory map, whether the process under test includes malware (block 660). For example, the inspection platform (e.g., using computing resource 224, processor 310, memory 315, storage component 320, input component 325, output component 330, communication interface 335, input component 355, switching component 360, output component 365, controller 370, and/or the like) may determine, based on the memory map, whether the process under test includes malware, as described above in connection with FIGS. 1A-1D.

Process 600 may include additional implementations, such as any single implementation or any combination of implementations described below and/or described with regard to any other process described herein.

In some implementations, the event may include at least one of the process under test being loaded into the virtual memory associated with the device, a processor of the device executing an instruction associated with the process under test, and/or the like. In some implementations, the inspection platform may provide, using the memory tracking element, an instruction, to the malware inspection element, to provide the memory tracking element with the notification of the event associated with the process under test.

In some implementations, when determining whether the process under test includes malware, the inspection platform may determine, using a malware inspection tool and based on tracking the one or more memory pages, whether the process under test includes malware, and may perform one or more actions based on determining that the process under test includes malware. In some implementations, the one or more actions may include at least one of quarantining the process under test, attempting to identify one or more additional actions that are to prevent the process under test from taking one or more malicious actions, and/or the like.

In some implementations, when determining whether the process under test includes malware, the inspection platform may inspect the one or more memory pages to determine whether the process under test stored malicious content in the one or more memory pages, monitoring the process under test's usage of the one or more memory pages, monitoring for the process under test requesting additional memory pages to be assigned to the process under test, and/or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   tracking, by a device and using a memory tracking element, memory page usage of a process under test,
      wherein the memory tracking element distinguishes a first set of memory pages of the process under test from a second set of memory pages used by a malware inspection element in inspecting the process under test, and
      wherein the memory tracking element is inserted prior to the malware inspection element into the process under test; and
   generating, by the device and based on tracking the memory page usage, a memory map associated with the process under test,
      wherein the memory map includes information identifying the first set of memory pages assigned to the process under test, and
      wherein the memory map includes information identifying the second set of memory pages being used by the malware inspection element.

2. The method of claim 1, wherein tracking the memory page usage comprises:
   providing an instruction to the malware inspection element to notify a memory tracking element of one or more events associated with the process under test.

3. The method of claim 2, wherein the one or more events include:
   the process under test being loaded into virtual memory,
   a memory operation associated with the process under test,
   a change to a memory page associated with the process under test, or
   an instruction being executed by the process under test.

4. The method of claim 1, wherein generating the memory map comprises:
   generating the memory map based on receiving a notification associated with the process under test being loaded in virtual memory.

5. The method of claim 1, wherein generating the memory map comprises:
   transmitting, using the memory tracking element, a request to the malware inspection element for information identifying a memory map range, and
   generating the memory map based on receiving the information identifying the memory map range.

6. The method of claim 1, wherein the memory map further includes a third set of memory pages that have not been identified as being used in the process under test.

7. The method of claim 1, further comprising:
   tracking a state held by the first set of memory pages.

8. A device, comprising:
   one or more memories; and
   one or more processors to:
      track, using a memory tracking element, memory page usage of a process under test,
         wherein the memory tracking element distinguishes a first set of memory pages of the process under test from a second set of memory pages used by a malware inspection element in inspecting the process under test, and
         wherein the memory tracking element is inserted prior to the malware inspection element into the process under test; and
      generate, based on tracking the memory page usage, a memory map associated with the process under test,
         wherein the memory map includes information identifying the first set of memory pages assigned to the process under test, and
         wherein the memory map includes information identifying the second set of memory pages being used by the malware inspection element.

9. The device of claim 8, wherein the one or more processors, to track the memory page usage, are to:
   provide an instruction to the malware inspection element to notify the memory tracking element of one or more events associated with the process under test.

10. The device of claim 9, wherein the one or more events include:
    the process under test being loaded into virtual memory,
    a memory operation associated with the process under test,
    a change to a memory page associated with the process under test, or
    an instruction being executed by the process under test.

11. The device of claim 8, wherein the one or more processors, to generate the memory map, are to:
    generate the memory map based on receiving a notification associated with the process under test being loaded in virtual memory.

12. The device of claim 8, wherein the one or more processors, to generate the memory map, are to:
    transmit, using the memory tracking element, a request to the malware inspection element for information identifying a memory map range, and
    generate the memory map based on receiving the information identifying the memory map range.

13. The device of claim 8, wherein the memory map further includes a third set of memory pages that have not been identified as being used in the process under test.

14. The device of claim 8, wherein the one or more processors are further to:
    track a state held by the first set of memory pages.

15. A non-transitory computer-readable medium storing a set of instructions, the set of instructions comprising:
    one or more instructions that, when executed by one or more processors of a device, cause the device to:

track, using a memory tracking element, memory page usage of a process under test,
    wherein the memory tracking element distinguishes a first set of memory pages of the process under test from a second set of memory pages used by a malware inspection element in inspecting the process under test, and
    wherein the memory tracking element is inserted prior to the malware inspection element into the process under test; and
generate, based on tracking the memory page usage, a memory map associated with the process under test,
    wherein the memory map includes information identifying the first set of memory pages assigned to the process under test, and
    wherein the memory map includes information identifying the second set of memory pages being used by the malware inspection element.

16. The non-transitory computer-readable medium of claim 15, wherein the one or more instructions, that cause the device to track the memory page usage, cause the device to:
provide an instruction to the malware inspection element to notify the memory tracking element of one or more events associated with the process under test,
    wherein the one or more events include:
        the process under test being loaded into virtual memory,
        a memory operation associated with the process under test,
        a change to a memory page associated with the process under test, or
        an instruction being executed by the process under test.

17. The non-transitory computer-readable medium of claim 15, wherein the one or more instructions, that cause the device to generate the memory map, cause the device to:
generate the memory map based on receiving a notification associated with the process under test being loaded in virtual memory.

18. The non-transitory computer-readable medium of claim 15, wherein the one or more instructions, that cause the device to generate the memory map, cause the device to:
transmit, using the memory tracking element, a request to the malware inspection element for information identifying a memory map range, and
generate the memory map based on receiving the information identifying the memory map range.

19. The non-transitory computer-readable medium of claim 15, wherein the memory map further includes a third set of memory pages that have not been identified as being used in the process under test.

20. The non-transitory computer-readable medium of claim 15, wherein the one or more instructions further cause the device to:
track a state held by the first set of memory pages.

* * * * *